United States Patent
Kato

(10) Patent No.: US 10,142,505 B2
(45) Date of Patent: Nov. 27, 2018

(54) MULTI-FUNCTION PRINTER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Nobuyuki Kato, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/947,942

(22) Filed: Apr. 9, 2018

(65) Prior Publication Data

US 2018/0227452 A1    Aug. 9, 2018

Related U.S. Application Data

(63) Continuation of application No. 14/919,860, filed on Oct. 22, 2015, now Pat. No. 9,973,641.

(51) Int. Cl.
   *G06F 3/12*    (2006.01)
   *H04N 1/00*    (2006.01)
   *G06F 3/16*    (2006.01)

(52) U.S. Cl.
   CPC ......... *H04N 1/00891* (2013.01); *G06F 3/167* (2013.01); *H04N 2201/0094* (2013.01)

(58) Field of Classification Search
   USPC ....................................................... 358/1.13
   See application file for complete search history.

(56) References Cited

U.S. PATENT DOCUMENTS

| | | | |
|---|---|---|---|
| 2005/0007445 A1* | 1/2005 | Foote | H04N 7/142 348/14.08 |
| 2006/0074686 A1 | 4/2006 | Vignoli | |
| 2011/0222095 A1 | 9/2011 | Sheng | |
| 2014/0343949 A1 | 11/2014 | Huang et al. | |
| 2016/0150124 A1 | 5/2016 | Panda et al. | |
| 2017/0013225 A1 | 1/2017 | Takahashi et al. | |
| 2017/0211968 A1 | 7/2017 | Kovacs et al. | |
| 2018/0130485 A1* | 5/2018 | Park | H04R 1/245 |

FOREIGN PATENT DOCUMENTS

| | | |
|---|---|---|
| JP | 2009-088701 | 4/2009 |
| JP | 2015-177426 | 10/2015 |

OTHER PUBLICATIONS

2014K14349, Apr. 2014, Derwent, Fang.*

(Continued)

*Primary Examiner* — Jerome Grant, II
(74) *Attorney, Agent, or Firm* — Amin, Turocy & Watson LLP

(57) ABSTRACT

A multi-function printer comprises: a printer engine unit having a function of switching the mode of the multi-function printer from a print mode to a power-saving mode based on predetermined conditions; a first to a third microphone arranged at intervals on the same plane; and a control section configured to determine the position of a sound source according to the difference between the moments sound sources are captured by the first to the third microphone and switch the mode of the multi-function printer from the power-saving mode to the print mode.

11 Claims, 10 Drawing Sheets

(56) References Cited

OTHER PUBLICATIONS

Non-Final Office Action for U.S. Appl. No. 14/919,860 dated Aug. 12, 2016.
Final Office Action for U.S. Appl. No. 14/919,860 dated Jan. 18, 2017.
Non-Final Office Action for U.S. Appl. No. 14/919,860 dated May 3, 2017.
Final Office Action for U.S. Appl. No. 14/919,860 dated Sep. 5, 2017.

* cited by examiner

MULTI-FUNCTION PRINTER

CROSS-REFERENCE TO RELATED APPLICATIONS

This application is a Continuation of application Ser. No. 14/919,860 filed on Oct. 22, 2015, the entire contents of which are incorporated herein by reference.

FIELD

Embodiments described herein relate to a multi-function printer having the functions of a printer, a copier, a scanner, a fax machine and the like.

BACKGROUND

Conventionally, in order to be suppressed in power consumption, a multi-function printer is equipped with a function of switching the multi-function printer not in use to a power-saving mode. However, the operator has to wait before the multi-function printer is completely preheated after recovering from the power-saving mode.

Thus, a function of carrying a camera on a multi-function printer to detect the approach of an operator at long distance and release a power-saving mode is well known. With this function, a pre-heating operation is ended or a wait time is shortened when the operator reaches a preset position.

However, to analyze the image data of the camera to detect the approach of an operator, a Central Processing Unit (CPU) at a high speed or a high-capacity memory is needed which consumes power while acting, resulting in a problem of poor power saving effect.

DETAILED DESCRIPTION

The present invention is described below with reference to embodiments when read in conjunction with accompanying drawings.

In accordance with an embodiment, a multi-function printer comprises: a printer engine unit having a print function of switching the mode of the multi-function printer from a print mode to a power-saving mode based on predetermined conditions (for example, after the multi-function printer stops serving for a given time, a first to a third microphone arranged on the same plane at intervals; and a control section configured to determine the position of a sound source according to the difference between the moments sound sources are captured by the first to the third microphone and switch the mode of the multi-function printer from the power-saving mode to the print mode.

(Embodiment 1)

Figure 1:
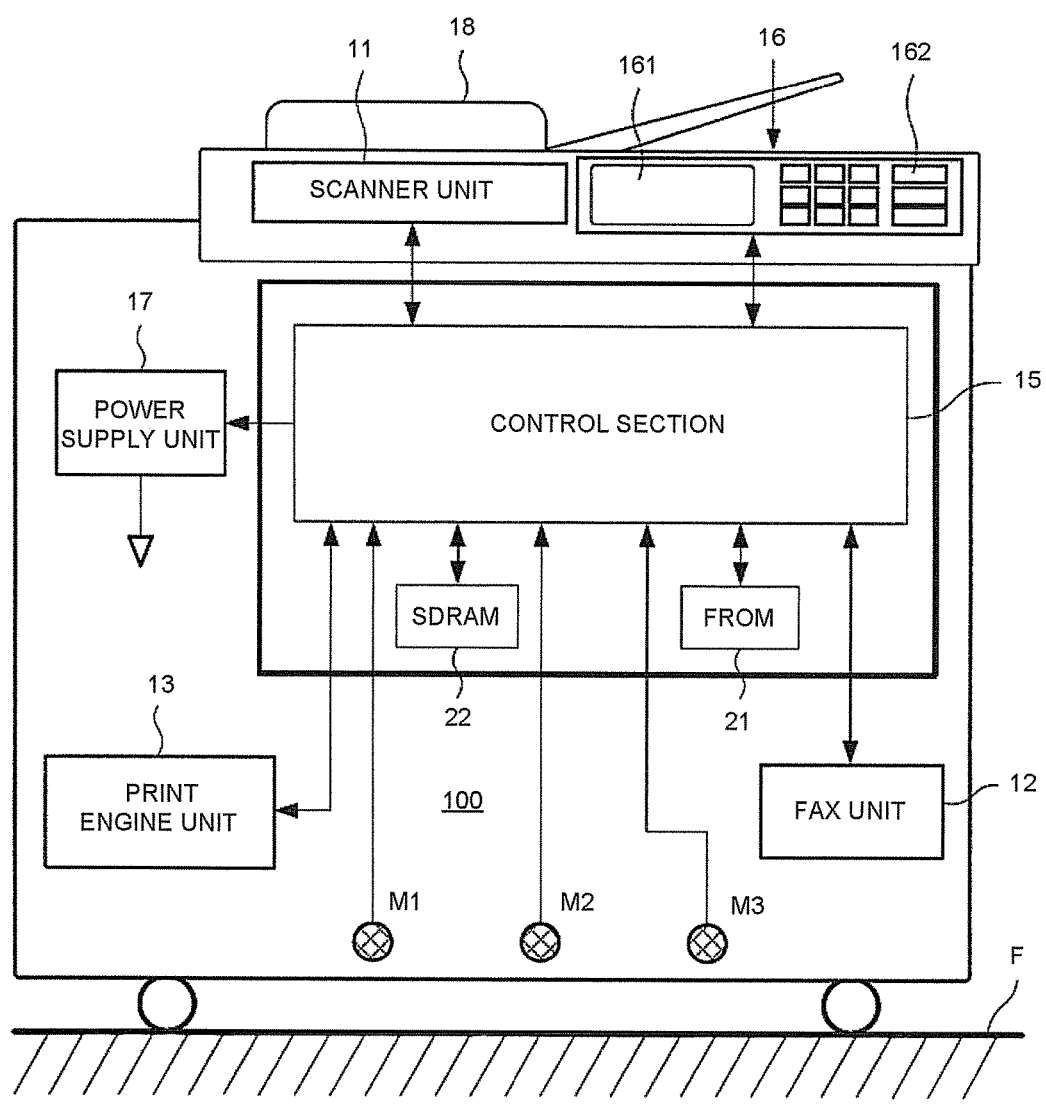
FIG. 1 is schematic structural diagram illustrating embodiment 1 of a multi-function printer.

FIG. 1 is schematic structural diagram illustrating an embodiment 1 of a multi-function printer. A multi-function printer 100 is an all-in-one multi-function printer which also has a copying function, a scanning function, an FAX function and other functions in addition to a print function.

As shown in FIG. 1, the multi-function printer 100 has a scanner unit 11 and an FAX unit 12 as a printing data input function and a printer engine unit 13 as a printing data output function.

Further, to control the printing data input function and the printing data output function, the multi-function printer 100 is provided with a control section 15. Further, the multi-function printer 100 also has a control panel 16 as a user interface function, a power supply unit 17 as a power supply function, an Auto Reverse Document Feeder (ARDF) 18 as a sheet feeding function and a sheet discharging function and a printer engine unit 13.

The scanner unit 11 is arranged below a transparent original document table (not shown) in such a manner that the scanner unit can freely reciprocate to scan in a secondary scanning direction. The scanner unit 11 comprises a light for illuminating an original document placed on the original document table, a mirror for deflecting the reflected light from the original document, a CCD functioning as a photoelectric conversion element for receiving an optical image from the mirror and a motor for mobile scan. The scanner unit 11 reads an original document image on the original document table by scanning one side of the original document. The read optical image is subjected to the photoelectric conversion implemented by the CCD and then a specified processing in an image processing section (not shown) and sequentially output to the control section 15 as printing data.

The FAX unit 12 capable of sending or receiving a fax to or from the outside is connected with the control section 15 for data communication.

The printer engine unit 13 forms an image in an electrophotographic type. The printer engine unit 13 generates an electrostatic latent image by performing scanning exposure on a photoreceptor using the light beams radiated from a laser light source which controls the illumination for the printing data processed for image formation. Next, the generated electrostatic latent image is developed with a toner, and the generated toner image is transferred on a sheet serving as a recording medium. Sequentially, the sheet on which the toner image is transferred passes a fixation section which is heated by a fixation heater so as to fix the toner image on the sheet. If a post-processing is indicated, then printout is conducted through the post-processing.

Further, although described as a printer engine unit of a laser type, the printer engine unit 13 may also be of an inkjet type.

The control section 15 may be a Central Processing Unit (CPU), a Micro Processing Unit (MPU) capable of executing the same operation processing with a CPU and the like. Further, the functions of the digital multi-function printer 100 can be partially or totally realized by an Application Specific Integrated Circuit serving as a processor.

The control panel 16 consists of a display 161 for displaying a setting screen or the state of a device and operational keys 162 for operating the digital multi-function printer 100. Further, the display 161 may be of a touch panel type, in this case, the functions of the operational keys 162 are displayed and operated on the touch panel.

The control section 15 is connected with the scanner unit 11, the FAX unit 12, the printer engine unit 13 and the control panel 16 in such a manner that the control section 15 is capable of communicating printing data with these components. Further, data can be written into or deleted from the control section.

Provided with a flash memory Read Only Memory (ROM) 21, the control section 15 also comprises a high-speed Synchronous Dynamic Random Access Memory (SDRAM) 22.

A multifunctional program for realizing an image processing function with a plurality of application software and device-related set values are stored in the flash memory ROM 21.

The data or printing data operated by the control section 15 is temporarily stored in the SDRAM 22.

When the control panel 16 carries out a print operation, the control section 15 controls the printer engine unit 13 under a print mode. The control section 15 prints the input printing data and output the printing data using the printer engine unit 13.

Further, the control section 15 switches the mode of the power supply unit 17 among a print mode, a ready mode, a power-saving mode and a close mode. The control unit 15 monitors the state of the digital multi-function printer 100 and switches a power supply to a power-saving mode when a given condition is met. The power-saving mode in which a print processing which should be implemented is not implemented is automatically switched to after a set power-saving mode switching time elapses.

A first to a third microphone M1-M3 are carried on the multi-function printer 100. The microphones M1-M3 are arranged in a staggered manner on the same plane which is close to the floor F. Further, the microphones M1-M3 are linearly arranged at intervals, as shown in FIG. 2 which illustrates a plane figure of the multi-function printer 100 observed from the direction of a roof.

For example, the footsteps captured by the microphones M1-M3 are provided to the control section 15. The microphones M1-M3 measure the position relationship between an operator approaching the multi-function printer 100 and the multi-function printer 100.

Figure 2:
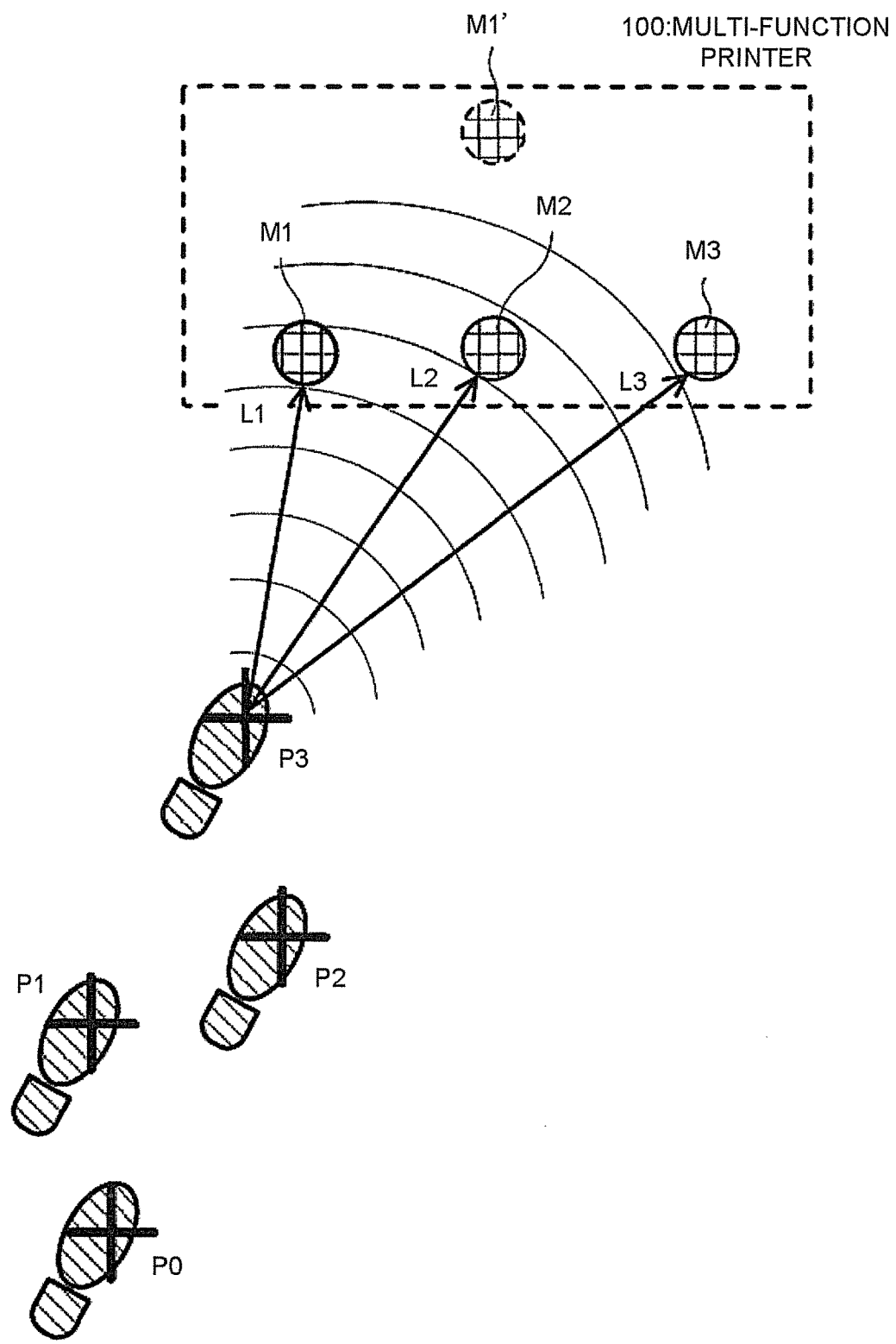
FIG. 2 is a diagram illustrating the coordinates of a microphone and a sound source.

In FIG. 2, P1-P3 represent the coordinates of the footprints of the operator of the multi-function printer 100. In FIG. 2, it is assumed that the operator approaches the multi-function printer 100 in the following coordinate sequence: P0→P1→P2→P3.

Figure 3A:
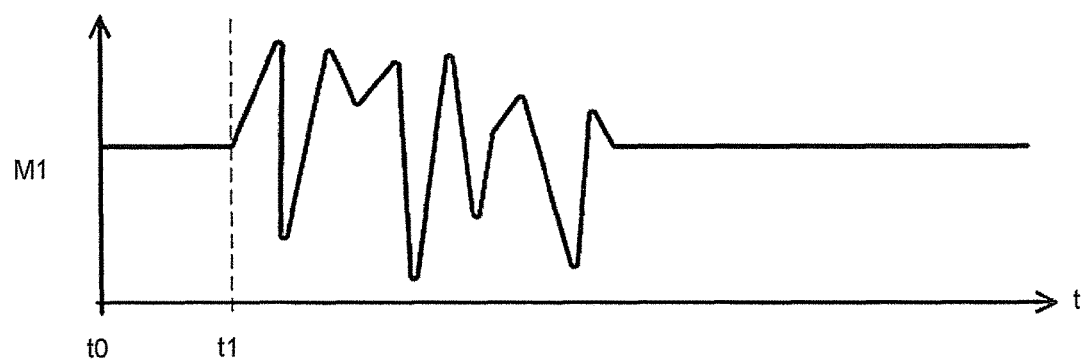
FIG. 3A is a schematic diagram illustrating a speech waveform captured by a microphone M1.
Figure 3B:
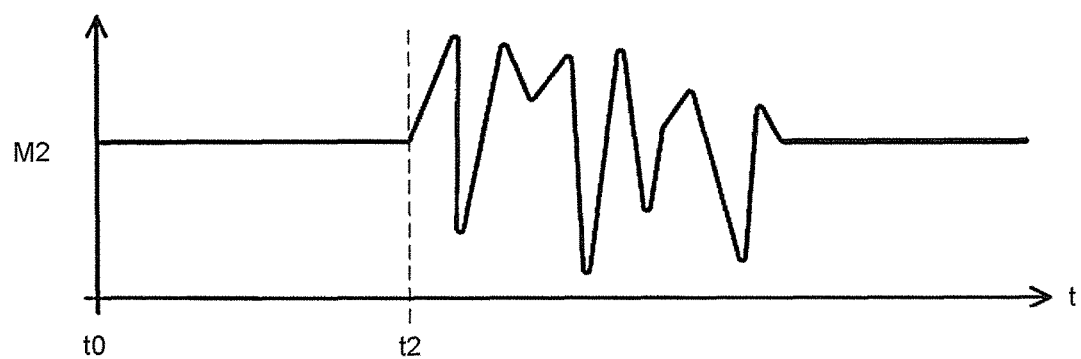
FIG. 3B is a schematic diagram illustrating a speech waveform captured by a microphone M2.
Figure 3C:
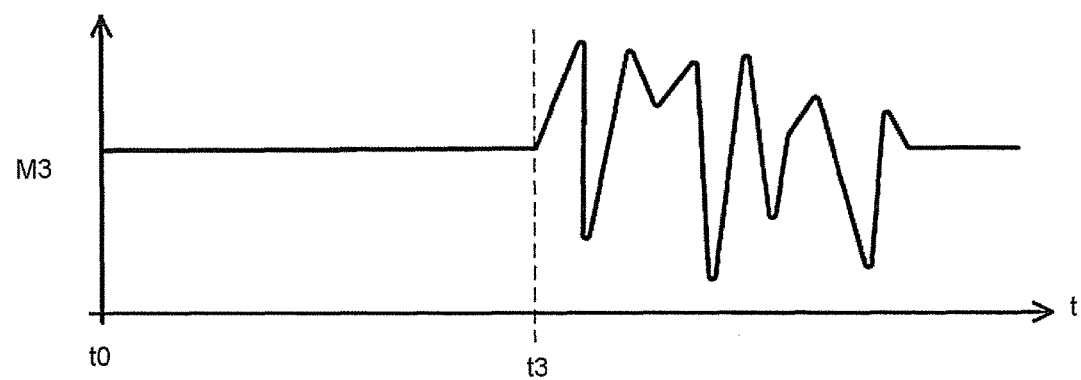
FIG. 3C is a schematic diagram illustrating a speech waveform captured by a microphone M3.

FIG. 3A is a schematic diagram illustrating a speech waveform captured by the microphone M1. FIG. 3B is a schematic diagram illustrating a speech waveform captured by the microphone M2. FIG. 3C is a schematic diagram illustrating a speech waveform captured by the microphone M3.

FIG. 3A-FIG. 3C show examples of the waveforms of the footsteps captured by the microphones M1-M3 heading towards the coordinates P3 shown in FIG. 2. A footstep arrives at t1 in the microphone M1. Similarly, a footstep arrives at t2 in the microphone M2 and at t3 in the microphone M3.

Figure 4:
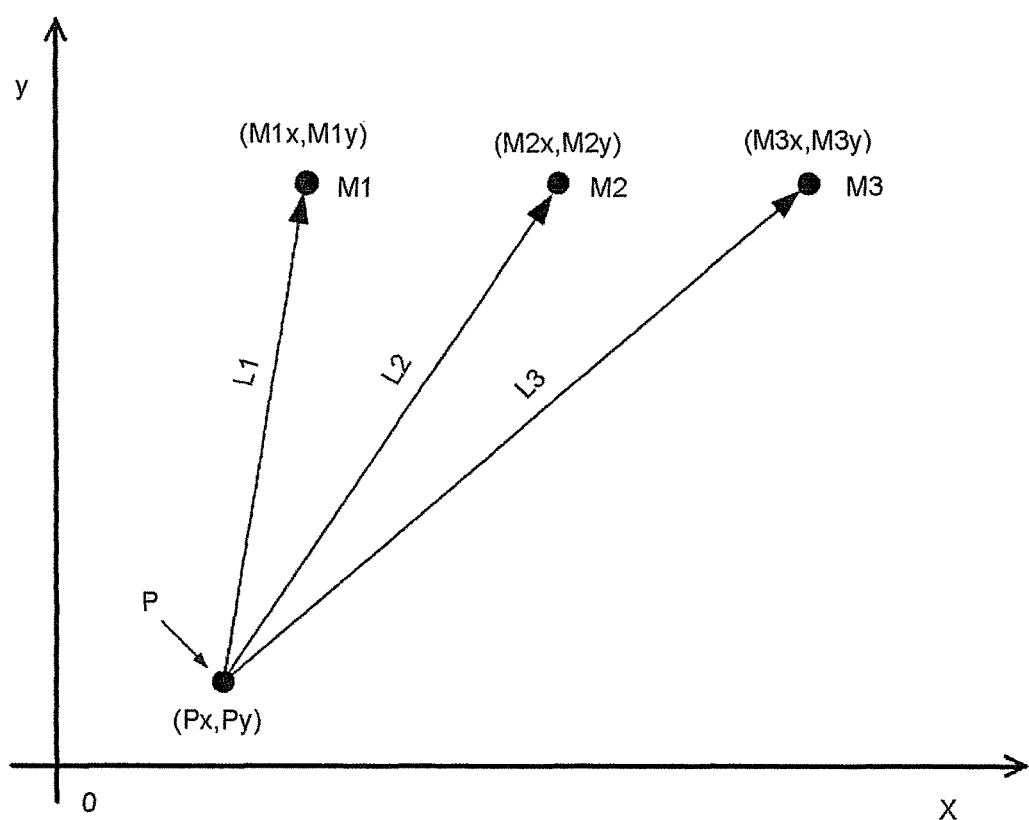
FIG. 4 is a diagram illustrating the position of a sound source.

Further, as shown in FIG. 3A-FIG. 3C, the distances between the coordinate P3 and the microphones M1-M3 are L1-L3. As shown in FIG. 4, the coordinates of the microphones M1-M3 are set to be (M1x,M1y), (M2x,M2y) and (M3x,M3y). Moreover, assume that the coordinates of a sound source P are (Px,Py) and a sound is generated at t0, as the transmission velocity of sound is definitely V, the following formulas (1)-(3) are met:

$$L1 = \sqrt{(Px-M1x)^2+(Py-M1y)^2} = V \times (t1-t0) \quad (1)$$

$$L2 = \sqrt{(Px-M2x)^2+(Py-M2y)^2} = V \times (t2-t0) \quad (2)$$

$$L3 = \sqrt{(Px-M3x)^2+(Py-M3y)^2} = V \times (t3-t0) \quad (3)$$

The coordinates (Px,Py) of the sound source P and a sound generation time t0 can be calculated using the foregoing formulas (1)-(3).

In the extraction implemented at t2 and t3, it should be deduced with which part of the speech waveform obtained by the microphone M2 or M3 the sound obtained by the microphone M1 at t1 is accordant. This deduction is realized according to the positions of the peaks of related functions for calculating the speech waveforms of the microphones M1 and M2 or M3.

In this way, the position of the footstep generated at the footprint coordinates P3 can be determined. If it is determined that the coordinates P0, P1 and P2 generated in the footprints calculated by the same manner gradually approach the multi-function printer 100, the power-saving mode of the multi-function printer 100 is released to preheat the multi-function printer 100.

Figure 5:
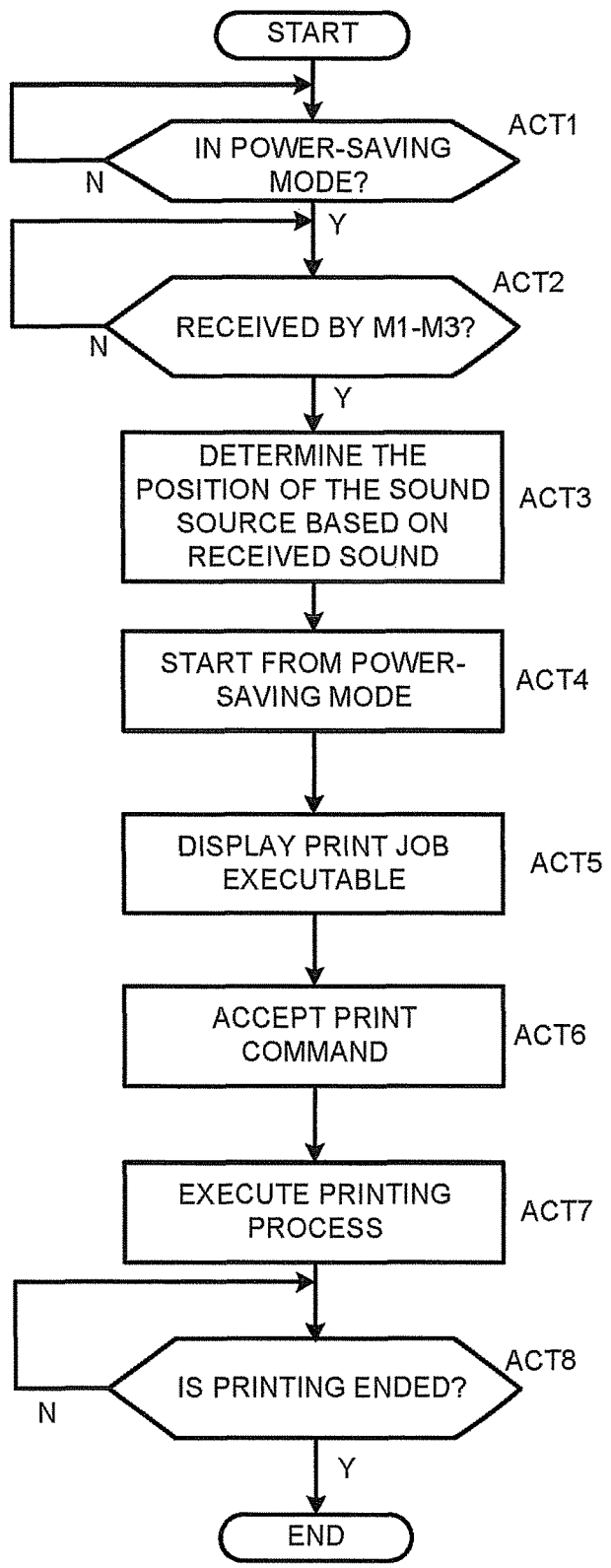
FIG. 5 is a flowchart illustrating a power-saving mode release processing.

FIG. 5 is a flowchart illustrating a processing starting with the footstep capturing by the multi-function printer 100 and ending with the release of a power-saving mode.

First, the control section 15 determines whether or not the multi-function printer 100 is in a power-saving mode (Act 1). The processing proceeds to Act 2 if the multi-function printer 100 is in a power-saving mode (Yes).

In Act 2, the control section 15 determines whether or not a sound signal is received by the microphones M1-M3. The processing proceeds to Act 3 if a footstep is captured by the microphones M1-M3 (Yes).

In Act 3, the control section 15 deduces the coordinates (Px,Py) through an operation based on formulas (1)-(3), thereby determining the position of the sound source P.

The control section 15 causes the multi-function printer 100 to start and sets the mode of the multi-function printer 100 from the power-saving mode to a print job executable mode (Act 4).

The control section 15 displays information 'print job executable' on the control panel 16 (Act 5).

When the operator operates the control panel 16, the multi-function printer 100 accepts a print command (Act 6).

The control section 15 starts the printer engine unit 13 to print and output the printing data processed for image formation (Act 7).

The control section 15 determines whether or not the printing of the printing data is ended (Act 8) and, if so, ends the processing.

If the multi-function printer 100 is not operated within a given time after the processing of Act 8 is ended, then the multi-function printer 100 enters the power-saving mode again.

In this way, the generation position of the sound source is determined by the three microphones carried on the multi-function printer according to the time difference between the arrivals of the sounds generated by an operator at the three microphones. Then, whether or not the operator approaches the multi-function printer is determined by tracking the generation source of a sound. Moreover, if it is determined that the operator approaches the multi-function printer 100, the power-saving mode of the multi-function printer 100 is released, without waiting for the arrival of the operator, to preheat the multi-function printer 100, thereby shortening a recovery wait time.

In the embodiment, the multi-function printer 100 can perceive the approach of an operator before the operator arrives at the installation position of the multi-function printer 100 and then release a power-saving mode to be preheated. In this way, a preheating wait time is shortened for the operator.

Further, the sound-based one-dimensional processing lowered in workload is more practicable when compared with the detection of the approach of an operator through a two-dimensional processing based on the images captured by a camera. The CPU can be realized by a component having a small processing capacity, thus reducing power consumption.

(Embodiment 2)

Figure 6:
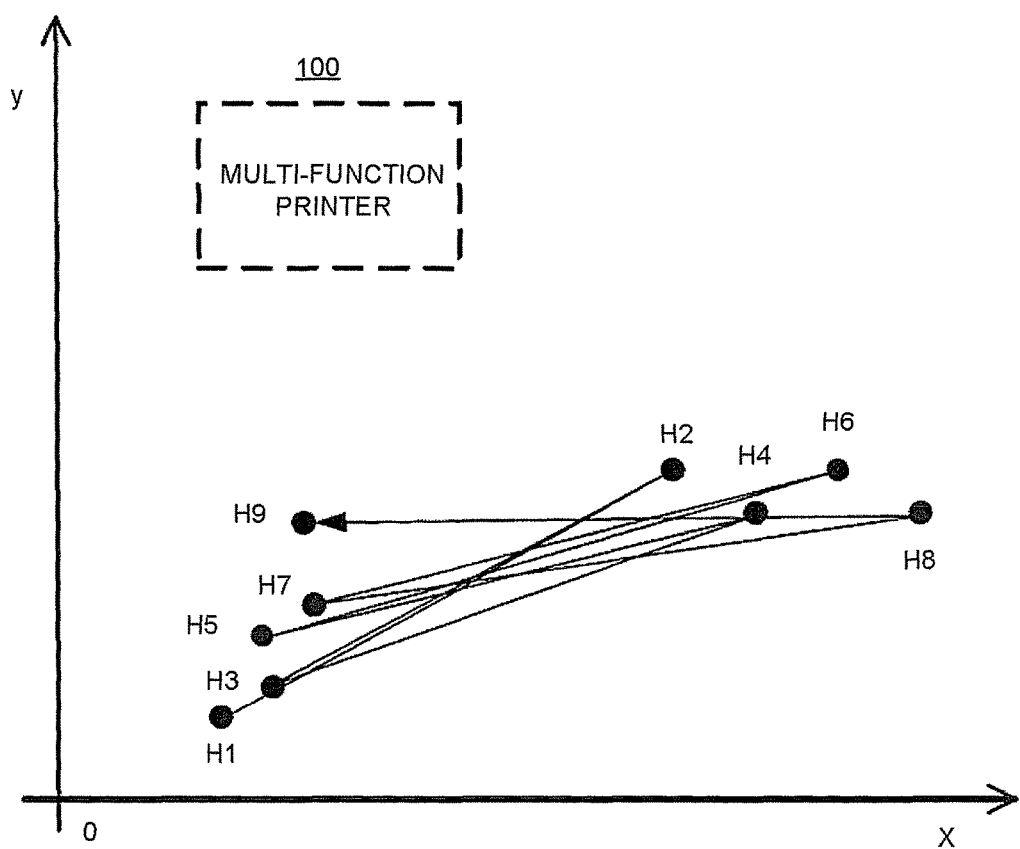
FIG. 6 is diagram illustrating embodiment 2 of a multi-function printer.
Figure 7:
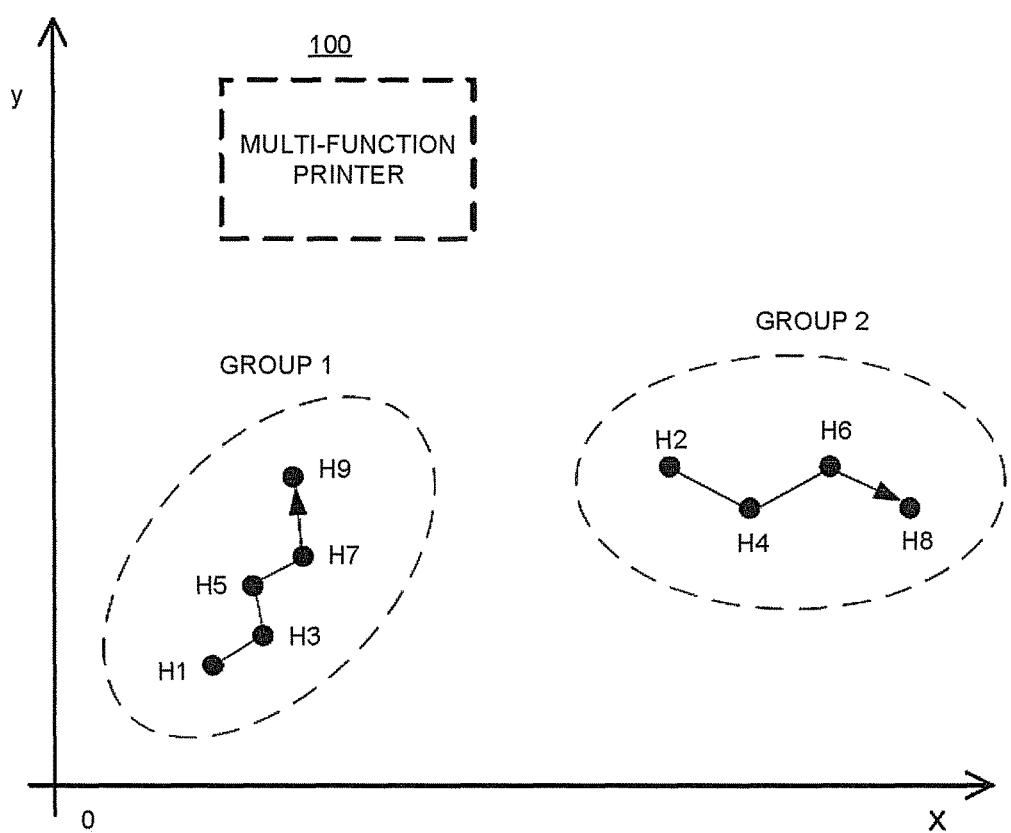
FIG. 7 is diagram illustrating embodiment 2 of a multi-function printer.

FIG. 6 and FIG. 7 are diagrams illustrating embodiment 2 of a multi-function printer. In the embodiment, a multi-function printer 100 determines the operator thereof among the more than one individual nearby the multi-function printer 100.

As shown in FIG. 6, when there are individuals H1-H9 nearby the multi-function printer 100, the footsteps of the individuals H1-H9 are captured by the microphones M1-M3. In this case, the approach of an individual cannot be detected accurately merely by calculating the distance between the multi-function printer 100 and a sound source in the sequence of the arrival of a sound at the multi-function printer 100.

However, as shown in FIG. 7, the approach of an individual can be detected to some extent by grouping the positions of sound sources. As the walking speed of human being is at most 1-2 m/s, flash move is impossible for human being, based on this, a sound source at a too long distance can be determined by the footstep of another individual.

FIG. 7 exemplified the grouping of individuals into group 1 and group 2. It is presumed that group 1 consists of individuals approaching the multi-function printer and group 2 consists of individuals passing the multi-function printer.

It is presumed that the distances between the footsteps of the individuals H9, H7, H5, H3 and H1 in group 1 and the multi-function printer 100 can be deduced according to formulas (1)-(3). If the presumption is achievable, then the control section 15 executes the same processing starting from Act 1 shown in FIG. 5.

In this way, even if there are footsteps of more than one individual, the operator approaching the multi-function printer 100 can be determined through a grouping operation, thus realizing the switching from a power-saving mode to a print mode.

The grouping is not limited to be based on the distance between a sound source and the multi-function printer 100. For example, the grouping may also be realized by merely extracting the sound approaching the multi-function printer 100 from the sounds captured by the microphones M1-M3.

(Embodiment 3)

Figure 8:
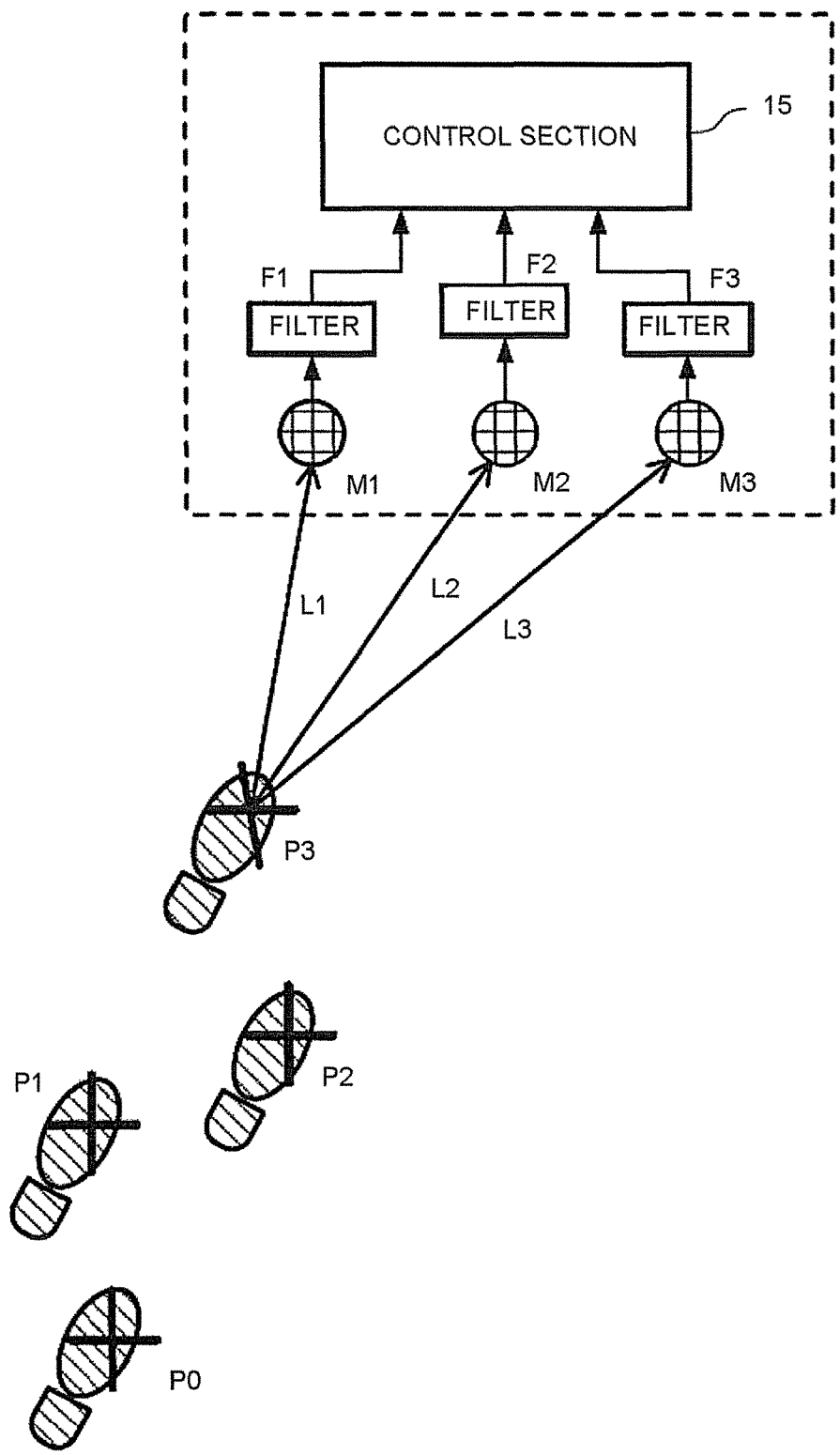
FIG. 8 is diagram illustrating embodiment 3 of a multi-function printer.

FIG. 8 illustrates embodiment 3. In the embodiment, the frequency characteristic of a microphone is changed so as to reduce the number of the types of the floor and the influence of surrounding noises.

The outputs of the microphones M1-M3 are supplied to the control section 15 via filters F1-F3, respectively. For example, if the floor is composed of a hard material such as ceramic tile, it is set that the filters F1-F3 are high-pass filters passing high frequency bands. Further, if the floor is composed of a soft material such as carpet, it is set that the filters F1-F3 are low-pass filters passing low frequency bands.

In this case, the control section 15 can capture the footsteps on the floor and decrease the obstacles to the setting conditions of the multi-function printer. Further, the setting conditions of the multi-function printer can be met with the use of the filters F1-F3 the frequency characteristic of which can be freely changed.

(Embodiment 4)

Figure 9:
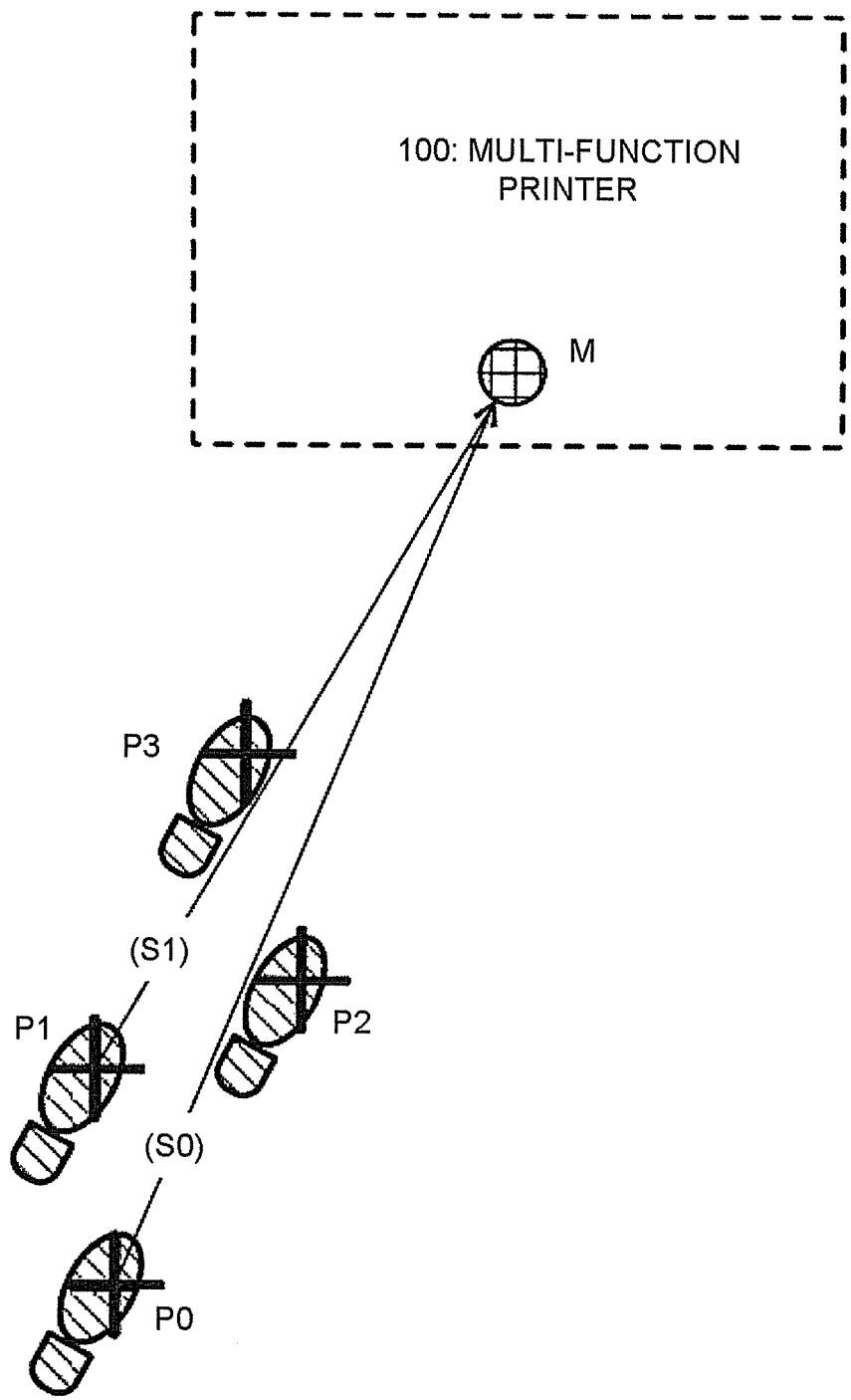
FIG. 9 is diagram illustrating embodiment 4 of a multi-function printer.

FIG. 9 illustrates embodiment 4. In the embodiment, the approach of an operator to the multi-function printer 100 is determined according to the change in the sound volume captured by a microphone M.

Assume that the microphone M captures a sound source P generated at the coordinates P0 shown in FIG. 9. It is assumed that the level of the sound S0 of the sound source P generated at the coordinates P0 is a reference value. Next, assume that the microphone M captures a sound source P generated at the coordinates P1 near the multi-function printer 100. In this case, the level of the sound S1 generated in the sound source P at the coordinates P0 is increased only at the approach of the sound to the multi-function printer 100. The control section 15 determines that the operator approaches the multi-function printer 100 and switches the mode of the multi-function printer 100 from a power-saving mode to a print mode.

In this embodiment, the switching from a power-saving mode to a print mode can be realized merely according to the change in the sound volumes captured by a microphone.

(Embodiment 5)

Figure 10A:
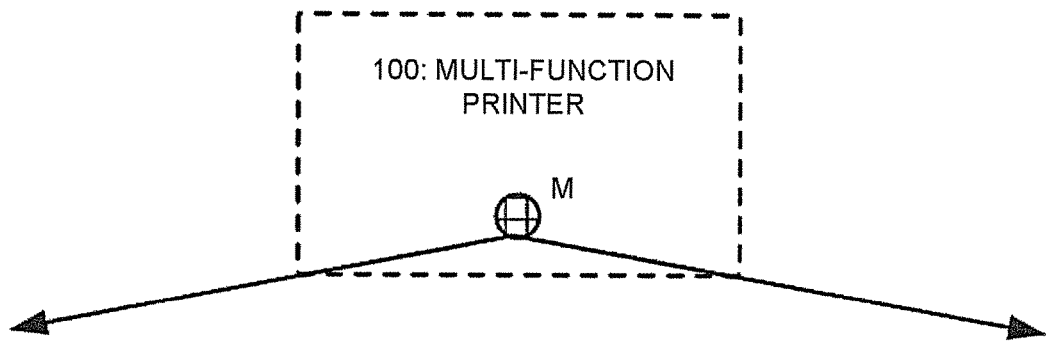
FIG. 10A is diagram illustrating embodiment 5 of a multi-function printer.
Figure 10B:
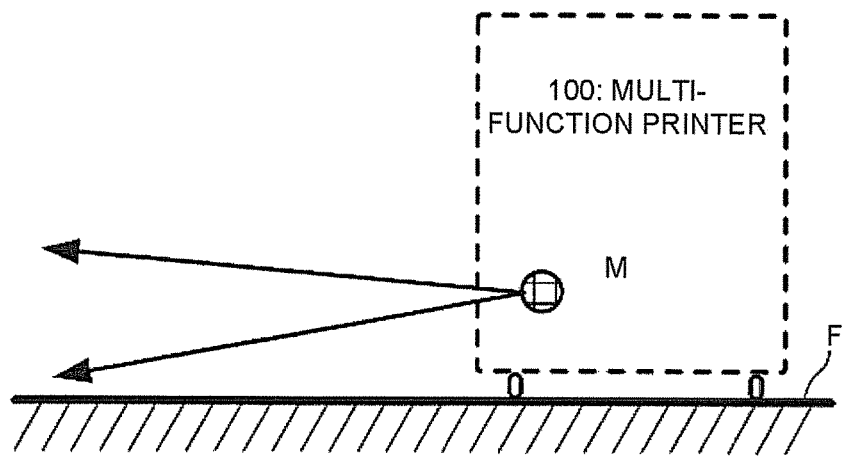
FIG. 10B is diagram illustrating embodiment 5 of a multi-function printer.

FIG. 10A and FIG. 10B illustrate embodiment 5. FIG. 10A shows the directivity of a microphone M when the multi-function printer 100 is observed from above, and FIG. 10B shows the directivity of a microphone M when the multi-function printer 100 is laterally observed. In the embodiment, the directivity of a microphone M is widened in the horizontal direction, as shown in FIG. 10A, and narrowed in the vertical direction, as shown in FIG. 10B. In this case, a sound can be captured in a wide range in the horizontal direction, and the sound from the direction of the floor can be easily captured in the vertical direction.

In the embodiment, by reducing the directivity of a microphone M in the vertical direction, it becomes difficult to capture a sound unrelated to a footstep above, thus preventing an error operation on the needless sounds captured by the microphone.

Further, the present invention is not limited to the foregoing embodiments. In order to generate a difference between the distances between the microphones M1-M3 and a sound source, the microphones M1-M3 may also be arranged non-linearly, for example, arranged as a triangle. FIG. 2 shows an example of the arrangement of the microphones M1-M3 as a triangle, and in FIG. 2, the position of the microphone M1' represented by dotted lines represents the microphone M2. In this case, the difference between the distances L1-L3 from the microphones M1-M3 to a sound source is greater than that between the distances L1-L3 from linearly arranged microphones M1-M3 to the sound source. Thus, a true improvement can be achieved on the determination of the coordinates (Px,Py) of a sound source and the generation time t0 of a sound.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A multi-function printer method comprising:
   preparing the mode of the multi-function printer between a power-saving mode and a print mode in a printer engine unit of a multi-function printer;
   arranging a first microphone to a third microphone at intervals on a single plane, in a staggered manner close to a floor, the first microphone to the third microphone are in the multi-function printer;
   determining positions of sound sources by a control section according to a time difference between sound sources that are captured by the first microphone to the third microphone, the time difference between the arrival of the sound sources indicating a user approaching the multi-function printer;
   determining sound source location positions by the control section, based on a distance calculation operation using coordinates of the microphones, the distances between footprint coordinates and the microphones, footstep sound arrival times, and transmission velocity of sound; and
   causing the print engine to be switched from the power-saving mode to the print mode depend on a decrease in the time difference between sound sources.

2. The multi-function printer method according to claim 1, wherein
   the intervals between the first microphone to the third microphone are non-linear.

3. The multi-function printer method according to claim 1, wherein
   the frequency characteristics of the sounds received by the first microphone to the third microphone are changed by filters.

4. The multi-function printer method according to claim 3, wherein
   the characteristics of the filters can be changed according for the generation of a sound source.

5. The multi-function printer method according to claim 1, wherein
   a plurality of sound sources captured by the first microphone to the third microphone are grouped, and the positions of each of the grouped sound sources are determined according to differences between a first grouped sound sources are determined according to differences between a first grouped sound source and second grouped sound source.

6. The multi-function printer method according to claim 4, wherein differences between the first grouped sound source and the second grouped sound source includes a difference in distance from the multi-function printer.

7. A multi-function printer method comprising:
   preparing the mode of the multi-function printer between a power-saving mode and a print mode in a printer engine unit of a multi-function printer, based on predetermined conditions;
   arranging at least two microphones in a staggered manner close to a floor;
   switching the mode of the multi-function printer from the power-saving mode to the print mode when a difference between levels of the sound captured by the at least two microphones indicate the approach of a user; and
   determining sound source location positions, based on a distance calculation operation using coordinates of the microphones, the distances between footprint coordinates and the microphones footstep sound arrival times, and transmission velocity of sound.

8. The multi-function printer method according to claim 7, wherein
   the frequency characteristics of the sounds received by the at least two microphones are changed by a filter.

9. The multi-function printer method according to claim 7, wherein
   the frequency characteristic of the filter can be changed according to conditions for the generation of a sound source.

10. The multi-function printer method according to claim 9, wherein
    the directivity of the microphone is widened in the horizontal direction and narrowed in the vertical direction.

11. The multifunction printer method according to claim 7, wherein the predetermined conditions include:
    a predetermined time from switching the mode of the multi-function printer to the print mode; and
    the tracking determining that a user is not at or approaching the multi-function printer.

* * * * *